(12) United States Patent
Chen et al.

(10) Patent No.: US 11,977,788 B2
(45) Date of Patent: May 7, 2024

(54) NETWORK CONNECTION CONFIGURATION METHOD, NETWORK CONNECTION CONFIGURATION APPARATUS, IMAGE FORMING APPARATUS, AND STORAGE MEDIUM

(71) Applicant: Zhuhai Pantum Electronics Co., Ltd., Zhuhai (CN)

(72) Inventors: Yinggui Chen, Zhuhai (CN); Zongxin Yang, Zhuhai (CN); Yongjiu Jiang, Zhuhai (CN); Han Yu, Zhuhai (CN); Lina Meng, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/336,917

(22) Filed: Jun. 16, 2023

(65) Prior Publication Data
US 2023/0333785 A1    Oct. 19, 2023

Related U.S. Application Data

(63) Continuation-in-part of application No. 17/466,388, filed on Sep. 3, 2021, now Pat. No. 11,687,298, which
(Continued)

(30) Foreign Application Priority Data

Mar. 5, 2019   (CN) .......................... 201910165132.2

(51) Int. Cl.
G06F 3/12       (2006.01)
H04W 12/03      (2021.01)
H04W 76/10      (2018.01)

(52) U.S. Cl.
CPC .......... *G06F 3/1204* (2013.01); *G06F 3/1236* (2013.01); *G06F 3/1238* (2013.01);
(Continued)

(58) Field of Classification Search
None
See application file for complete search history.

(56) References Cited

U.S. PATENT DOCUMENTS

| | | | |
|---|---|---|---|
| 2013/0100855 | A1 | 4/2013 | Jung et al. |
| 2015/0146241 | A1 | 5/2015 | Lee |
| 2018/0015755 | A1 | 1/2018 | Yamada |

FOREIGN PATENT DOCUMENTS

| | | |
|---|---|---|
| CN | 102869014 A | 1/2013 |
| CN | 103716911 A | 4/2014 |

(Continued)

OTHER PUBLICATIONS

English translation of CN-110035433-A. (Year: 2019).*
(Continued)

*Primary Examiner* — Thomas D Lee
(74) *Attorney, Agent, or Firm* — Anova Law Group, PLLC

(57) ABSTRACT

The present disclosure provides a network connection configuration method and an apparatus thereof. The method includes sending out first network identification information without a corresponding encryption key and second network identification information with a corresponding encryption key, such that a first terminal device receives the first network identification information and the second network identification information; during a state of sending out the first and second network identification information, monitoring whether a request is received to establish the keyless communication connection based on the first network identification information; when the request is received to establish the keyless communication connection based on the first network identification information, establishing the keyless communication connection with the first terminal device; obtaining wireless network information sent by the first terminal device based on the keyless communication con-
(Continued)

nection; and establishing a communication connection with a wireless network device based on the wireless network information.

13 Claims, 6 Drawing Sheets

Related U.S. Application Data is a continuation-in-part of application No. PCT/CN2020/077496, filed on Mar. 2, 2020.

(52) U.S. Cl.
CPC ............ *H04W 12/03* (2021.01); *H04W 76/10* (2018.02); *G06F 3/1292* (2013.01)

(56) References Cited

FOREIGN PATENT DOCUMENTS

| | | | | | |
|---|---|---|---|---|---|
| CN | 104244245 | A | | 12/2014 | |
| CN | 104301891 | A | | 1/2015 | |
| CN | 105407450 | A | | 3/2016 | |
| CN | 105898830 | A | | 8/2016 | |
| CN | 106535301 | A | | 3/2017 | |
| CN | 107800916 | A | | 3/2018 | |
| CN | 110035433 | A | * | 7/2019 | ............. H04L 9/085 |
| EP | 2919446 | A1 | | 9/2015 | |

OTHER PUBLICATIONS

The World Intellectual Property Organization (WIPO) International Search Report for PCT/CN2020/077496 dated May 27, 2020 5 Pages (including translation).
English translation of CN-104244245-A. (Year: 2014).
English translation of CN-104301891-A. (Year: 2015).

* cited by examiner

NETWORK CONNECTION CONFIGURATION METHOD, NETWORK CONNECTION CONFIGURATION APPARATUS, IMAGE FORMING APPARATUS, AND STORAGE MEDIUM

CROSS-REFERENCE TO RELATED APPLICATION

This application is a continuation-in-part application of U.S. patent application Ser. No. 17/466,388, filed on Sep. 3, 2021, which is a continuation-in-part application of PCT Patent Application No. PCT/CN2020/077496, filed on Mar. 2, 2020, which claims priority to Chinese patent application No. 201910165132.2, filed on Mar. 5, 2019, the entirety of all of which is incorporated herein by their reference.

TECHNICAL FIELD

The present disclosure generally relates to the field of wireless network configuration technology and, more particularly, relates to a network connection configuration method, a network connection configuration apparatus, an image forming apparatus, and a storage medium.

BACKGROUND

An image forming apparatus refers to an apparatus which prints data generated in an electronic device (e.g., a computer or the like) on record paper. In order to ensure that the image forming apparatus can obtain print data of more electronic devices, a wireless network connection may be normally established between the image forming apparatus and a wireless network device (e.g., a wireless router, a wireless access point, or the like).

The inventors of the present disclosure have found that in the existing technology, when establishing the connection between the image forming apparatus and the wireless network device, a user needs to manually connect the electronic device to a soft access point (soft AP) (e.g., entering a network identification information and a password of the soft AP, and the like) of the image forming apparatus; and connection information of the wireless network device (e.g., a service set identifier (SSID) and/or an encryption key of the wireless router) may be sent to the image forming apparatus, such that the image forming apparatus may establish a connection with the wireless network device according to the connection information. Therefore, for users who are not familiar with operations such as entering the network identification information and the encryption key of the soft AP, the image forming apparatus is extremely inconvenient to use with low user experience.

SUMMARY

The objective of the present disclosure is to provide a network connection configuration method, a network connection configuration apparatus, an image forming apparatus, and a storage medium, which may ensure that the image forming apparatus and a wireless network device establish a communication connection quickly and conveniently, and further ensure communication security between the image forming apparatus and the electronic device.

To achieve above-mentioned objective, the following technical solutions are used in embodiments of the present disclosure.

Embodiments of the present disclosure provide a network connection configuration method. The method includes sending out first network identification information without a corresponding encryption key and second network identification information with a corresponding encryption key, such that a first terminal device receives the first network identification information and the second network identification information, where the first network identification information is configured to enable the first terminal device to establish a keyless communication connection with an image forming apparatus based on the first network identification information, and the second network identification information is configured to enable the first terminal device to establish a key communication connection with the image forming apparatus based on the second network identification information with the corresponding encryption key; during a state of sending out the first network identification information and the second network identification information, monitoring whether a request is received to establish the keyless communication connection based on the first network identification information; when the request is received from the first terminal device to establish the keyless communication connection based on the first network identification information, establishing the keyless communication connection with the first terminal device; obtaining wireless network information sent by the first terminal device based on the keyless communication connection; and establishing a communication connection with a corresponding wireless network device based on the wireless network information.

Embodiments of the present disclosure provide an image forming apparatus. The image forming apparatus includes a memory, for storing computer-executable instructions; and at least one processor, coupled with the memory and configured, when the computer-executable instructions being executed, to perform a network connection configuration method. The method includes sending out first network identification information without a corresponding encryption key and second network identification information with a corresponding encryption key, such that a first terminal device receives the first network identification information and the second network identification information, where the first network identification information is configured to enable the first terminal device to establish a keyless communication connection with an image forming apparatus based on the first network identification information, and the second network identification information is configured to enable the first terminal device to establish a key communication connection with the image forming apparatus based on the second network identification information with the corresponding encryption key; during a state of sending out the first network identification information and the second network identification information, monitoring whether a request is received to establish the keyless communication connection based on the first network identification information; when the request is received from the first terminal device to establish the keyless communication connection based on the first network identification information, establishing the keyless communication connection with the first terminal device; obtaining wireless network information sent by the first terminal device based on the keyless communication connection; and establishing a communication connection with a corresponding wireless network device based on the wireless network information.

Embodiments of the present disclosure provide a network connection configuration method. The method includes sending out second network identification information with a corresponding encryption key, such that a terminal device receives the second network identification information, where the second network identification information is configured to enable the terminal device to establish a key communication connection with an image forming apparatus based on the second network identification information with the corresponding encryption key; the second network identification information is further configured to enable the terminal device to determine first network identification information without a corresponding encryption key based on the second network identification information; and the first network identification information is configured to enable the terminal device to establish a keyless communication connection with the image forming apparatus based on the first network identification information; during a state of sending out the second network identification information, monitoring whether a request is received to establish the keyless communication connection based on the first network identification information; when the request is received from the terminal device to establish the keyless communication connection based on the first network identification information, establishing the keyless communication connection with the terminal device; obtaining wireless network information sent by the terminal device based on the keyless communication connection; and establishing a communication connection with a corresponding wireless network device based on the wireless network information.

Embodiments of the present disclosure provide a non-transitory computer-readable storage medium, containing program instructions for, when being executed by a processor, performing above-mentioned network connection configuration methods.

Embodiments of the present disclosure provide a network connection configuration method, applied to a terminal device. The method includes searching an image forming apparatus and obtaining first network identification information without a corresponding encryption key and second network identification information with a corresponding encryption key which are sent out by the image forming apparatus, where the first network identification information is configured to enable the terminal device to establish a keyless communication connection with the image forming apparatus based on the first network identification information, and the second network identification information is configured to enable the terminal device to establish a key communication connection with the image forming apparatus based on the second network identification information with the corresponding encryption key; establishing the keyless communication connection with the image forming apparatus based on the first network identification information; and after establishing the keyless communication connection with the image forming apparatus, transmitting wireless network information to the image forming apparatus based on the keyless communication connection, where the wireless network information is configured to enable the image forming apparatus to establish a communication connection with a corresponding wireless network device based on the wireless network information.

Embodiments of the present disclosure provide a network connection configuration method, applied to a terminal device. The method includes searching an image forming apparatus and obtaining second network identification information with a corresponding encryption key sent out by the image forming apparatus, where the second network identification information is configured to enable the terminal device to establish a key communication connection with the image forming apparatus based on the second network identification information with the corresponding encryption key; the second network identification information is further configured to enable the terminal device to determine first network identification information without a corresponding encryption key based on the second network identification information; and the first network identification information is configured to enable the terminal device to establish a keyless communication connection with the image forming apparatus based on the first network identification information; obtaining the first network identification information based on the second network identification information; establishing the keyless communication connection with the image forming apparatus based on the first network identification information; and after establishing the keyless communication connection with the image forming apparatus, transmitting wireless network information to the image forming apparatus based on the keyless communication connection, where the wireless network information is configured to enable the image forming apparatus to establish a communication connection with a corresponding wireless network device based on the wireless network information.

In the network connection configuration method, the network connection configuration apparatus, the image forming apparatus, and the storage medium provided in various embodiments of the present disclosure, the electronic device may establish the keyless communication connection with the image forming apparatus through sending out the first SSID without a corresponding encryption key, which may ensure that the image forming apparatus and the electronic device are connected quickly and conveniently to receive wireless network information and establish the communication connection with the wireless network device, thereby avoiding the poor experience problem due to the need for the user to perform corresponding connection operations in the existing technology; furthermore, after the image forming apparatus establishes the communication connection with the wireless network device, the second SSID with the corresponding encryption key may be sent out to replace the first SSID, such that the electronic device and the image forming apparatus establish the key communication connection to ensure the security of the communication connection between the image forming apparatus and the electronic device, which has extremely high practicability.

In order to make above-mentioned objectives, features and advantages of the present disclosure more obvious and understandable, the optional embodiments and accompanying drawings are described in detail hereinafter.

DETAILED DESCRIPTION

Figure 1:
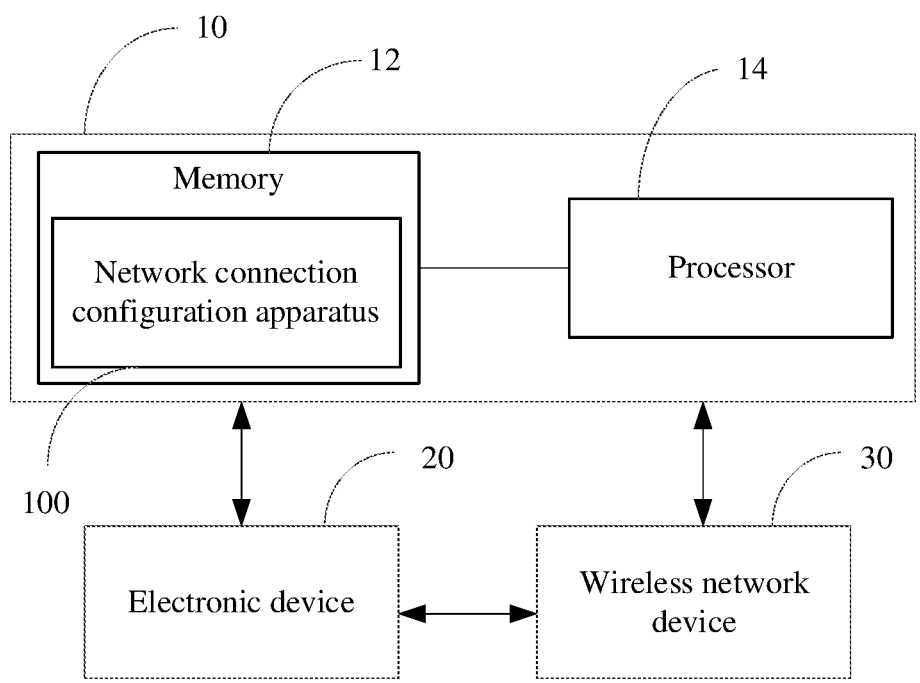
FIG. 1 illustrates an application block diagram of an image forming apparatus according to various exemplary embodiments of the present disclosure.

In order to illustrate objectives, technical solutions and advantages of embodiments of the present disclosure more clearly, the technical solutions in embodiments of the present disclosure may be clearly and completely described with reference to the drawings in embodiments of the present disclosure hereinafter. Obviously, described embodiments may be a part of embodiments, rather than all of embodiments, of the present disclosure. The components in embodiments of the present disclosure described and shown in the drawings herein may be arranged and designed in various different configurations.

Therefore, the following detailed description of embodiments of the present disclosure provided in the drawings may not be intended to limit the scope of the claimed disclosure but may merely represent optional embodiments of the present disclosure. Based on embodiments of the present disclosure, all other embodiments obtained by those skilled in the art without creative work shall fall within the protection scope of the present disclosure.

It should be noted that similar reference numerals and letters indicate similar items in the following drawings. Therefore, once a certain item is defined in one drawing, it does not need to be further defined and explained in the subsequent drawings. In the description of the present disclosure, the terms "first", "second", "third", "fourth" and the like may merely be used to distinguish the description and may not be understood as merely or implying relative importance.

In the description of the present disclosure, unless expressly stipulated and limited otherwise, the terms "configuration", "connection", and "join" should be interpreted in a broad sense. For example, "connection" can be a fixed connection, a detachable connection, or an integral connection; can be a mechanical connection or an electrical connection; can be a direct connection, or an indirect connection through an intermediate medium; and can also be the internal communication between two components. For those skilled in the art, the specific meaning of above-mentioned terms in the present disclosure may be understood under specific circumstances.

As shown in FIG. 1, embodiments of the present disclosure provide an image forming apparatus. The image forming apparatus 10 may include a memory 12, a processor 14 and a network connection configuration apparatus 100.

The memory 12 and the processor 14 may be, directly or indirectly, electrically connected to implement data transmission or exchange. For example, the memory 12 and the processor 14 may be electrically connected to each other through one or more communication buses or signal lines. The network connection configuration apparatus 100 may include at least one software function module which can be stored in the memory 12 in the form of software or firmware. The processor 14 may be configured to execute executable computer programs stored in the memory 12, including the software function module, the computer programs and the like included in the network connection configuration apparatus 100, thereby implementing a network connection configuration method.

The memory 12 may be, but may not be limited to, a random-access memory (RAM), a read-only memory (ROM), a programmable read-only memory (PROM), an erasable programmable read-only memory (EPROM), an electric erasable programmable read-only memory (EEPROM), and/or the like. The memory 12 may be configured to store programs, and the processor 14 may be configured to execute the programs after receiving execution instructions.

The processor 14 may be an integrated circuit chip with signal processing capability. Above-mentioned processor 14 may be a general-purpose processor, including a central processing unit (CPU), a network processor (NP), a system on chip (SoC) and/or the like; and may also be a digital signal processor (DSP), an application specific integrated circuit (ASIC), a field programmable gate array (FPGA), a programmable logic device, a discrete gate or transistor logic device, or a discrete hardware component. Various methods, steps, and logical block diagrams disclosed in embodiments of the present disclosure may be implemented or executed by the processor. The general-purpose processor may be a microprocessor, or the processor may also be any conventional processor and/or the like.

Figure 2:
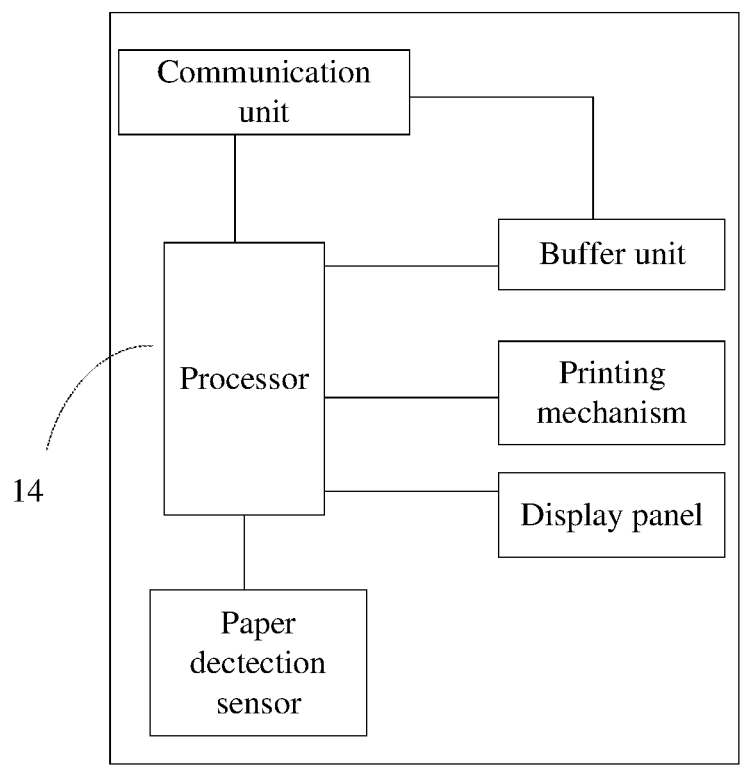
FIG. 2 illustrates a schematic block diagram of an image forming apparatus according to various exemplary embodiments of the present disclosure.

It should be understood that the structure shown in FIG. 1 is merely exemplary, and the image forming apparatus 10 may also include more or less components than those shown in FIG. 1, or have a configuration different from that shown in FIG. For example, as shown in FIG. 2, the image forming apparatus 10 may further include a display panel, a communication unit, a cache unit (also called a memory, such as DDR3 or DDR4), a printing mechanism, a sensor, and the like. In addition, each component shown in FIG. 1 and FIG. 2 may be implemented by hardware, software, or a combination thereof.

It should be noted that the types of the image forming apparatuses 10 may not be limited according to embodiments of the present disclosure. For example, the image forming apparatuses 10 may be divided according to functions. The image forming apparatuses 10 may include, but may not be limited to, a printer, a copier, a fax machine, a scanner, and an all-in-one machine which integrate printing, copying, faxing, scanning and other functions.

For another example, according to different image forming principles of the image forming apparatuses 10, the image forming apparatuses 10 may include, but may not be limited to, an inkjet printer, a laser printer, an LED printer, and/or the like.

The image forming apparatus 10 may send out network identification information. The network identification information may indicate that the image forming apparatus 10 may be discovered and connected as a Bluetooth device or a wireless router; or may be used as a point-to-point connection object under Wi-Fi direct communication or a connection object under NFC communication. The network identification information may be S SID or other types of identification information. For example, the network identification information may be the communication interface number of the image forming apparatus 10.

The image forming apparatus 10 may send out multiple different network identification information, and different network identification information may correspond to different access modes.

For example, the image forming apparatus 10 may at least send out the first network identification information without a corresponding encryption key and the second network identification information with a corresponding encryption key. An electronic device 20 that receives the first network identification information may establish a keyless communication connection with the image forming apparatus 10 based on the first network identification information. The electronic device 20 that receives the second network identification information may establish a key communication connection with the image forming apparatus 10 based on the second network identification information and the corresponding encryption key.

That is, based on the first network identification information, at the end of the electronic device 20, the communication connection with the image forming apparatus 10 may be implemented without the user inputting a key. Based on the second network identification information, at the end of the electronic device 20, the user may need to input a key to implement the communication connection with the image forming apparatus 10.

Embodiments of the present disclosure also provide a network connection configuration method applicable to above-mentioned image forming apparatus 10, where the method steps defined in the process related to the network connection configuration method may be implemented by the image forming apparatus 10.

The network connection configuration method is illustrated below by taking the network identification information as the SSID (the first network identification information may be the first SSID, and the second network identification information may be the second SSID). In other embodiments of the network connection configuration method, the network identification information may be other types of identification information. For example, the first network identification information may be the first communication interface number, and the second network identification information may be the second communication interface number.

Figure 3:
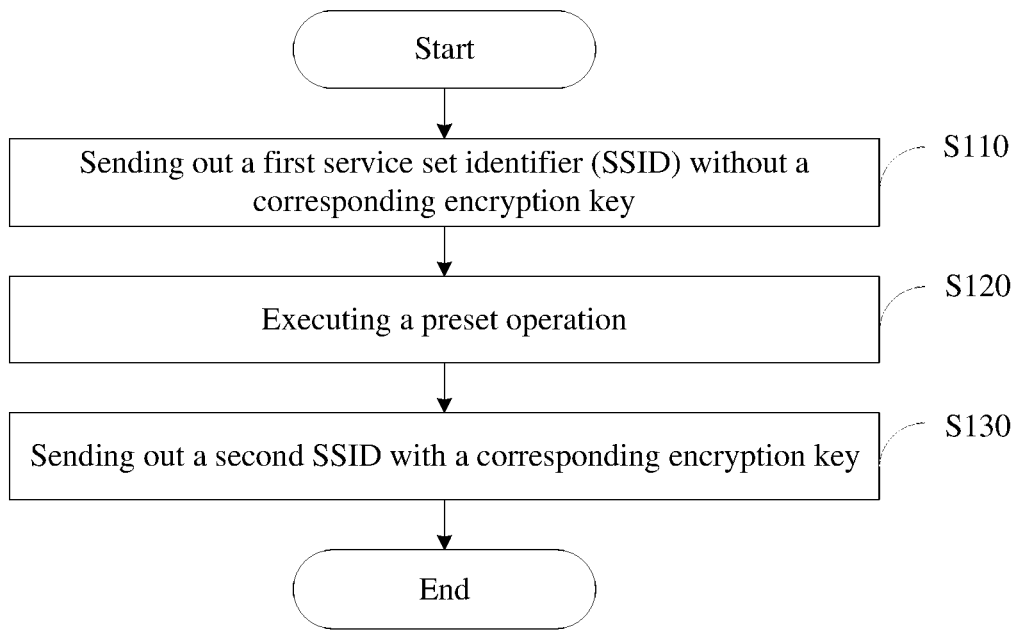
FIG. 3 illustrates a schematic flowchart of a network connection configuration method according to various exemplary embodiments of the present disclosure.

FIG. 3 illustrates an implementation flowchart of a network connection configuration method according to various exemplary embodiments of the present disclosure.

The process shown in FIG. 3 is described in detail hereinafter.

In S110, the first SSID without a corresponding encryption key may be sent out.

It should be noted that the image forming apparatus 10 may send out the first SSID when receiving a trigger instruction. In other words, the operation of sending out the first SSID may be configured with a corresponding trigger mechanism.

The manner or device for generating the trigger instruction may not be limited according to embodiments of the present disclosure and may be selected according to actual application requirements. For example, in an optional embodiment, the trigger instruction may be an instruction sent by the electronic device 20 communicatively connected with the image forming apparatus 10.

For another example, in another optional embodiment, if the image forming apparatus 10 has a control panel, a corresponding turn-on button may be configured on the control panel to generate the trigger instruction when the user presses the button. Or the turn-on button may be reused with other buttons inherent in the control panel of the image forming apparatus 10. For example, the control panel of the image forming apparatus 10 may be disposed with a Wi-Fi button; and the Wi-Fi button may be configured to turn on a soft AP working mode when the Wi-Fi button is pressed for a short time (e.g., less than 1 s), and turn on a network configuration mode when the Wi-Fi button is pressed for a long time (e.g., greater than 1 s). In addition, when the network configuration mode is turned on, the soft AP of the image forming apparatus 10 may send out the first SSID, such that the electronic device 20 which receives the first SSID may be quickly connected with the image forming apparatus 10 without requiring an encryption key. When the user triggers the image forming apparatus 10 to send out the first SSID using the control panel of the image forming apparatus 10, the electronic device 20 may quickly establish the keyless communication connection with the image forming apparatus 10; and the image forming apparatus 10 may establish a connection with the wireless network device 30 after receiving the wireless network information from the electronic device 20. Compared with the existing technology that operations, such as entering network identification information or a password, are required to establish the connection between the electronic device 20 and the image forming apparatus 10, the solutions provided by embodiments of the present disclosure may reduce the user's operation steps and implement one-key (or one-click) configuration of the network connection to the image forming apparatus 10. That is, the user may only need to turn on the network configuration mode of the image forming apparatus 10 with one key (or one click), such that the electronic device 20 may be connected to the image forming apparatus 10 without an encryption key and may send the wireless network information to the image forming apparatus 10.

For example, before executing S110, in order to ensure that the electronic device 20 can send the trigger instruction to the image forming apparatus 10, the image forming apparatus 10 may establish the communication connection with the electronic device 20 via sending out the second SSID, or via a USB interface, a wired network, or other wireless connection manners (e.g., Bluetooth, infrared, NFC and/or the like), such that the electronic device 20 may send the trigger instruction to the image forming apparatus 10. The electronic device 20 may send the trigger instruction based on a driver installed on an operating system, or the electronic device 20 may generate the trigger instruction in response to a user operation.

In the process of installing the driver on the electronic device 20, the image forming apparatus 10 needs to establish the communication connection with the electronic device 20 via sending out the second SSID, or via a USB interface, other wired cables or wired networks, or other wireless connection manners. Therefore, the trigger instruction may be sent to the image forming apparatus 10, through the installed driver, directly based on the communication connection. In such way, it may solve the problem that the process of establishing the communication connection between the image forming apparatus 10 and the wireless network device 30 is complicated due to the need for the user to operate the control panel of the image forming apparatus 10 to generate the trigger instruction, thereby effectively improving user experience.

It should be noted that when the image forming apparatus 10 communicates with the electronic device 20 by sending out the second SSID, the communication connection may be a key communication connection. That is, a terminal of the electronic device 20 may need to establish the communication connection with the image forming apparatus 10 based on the second SSID and the corresponding encryption key.

Through above-mentioned step, the electronic device 20 may quickly and conveniently establish the communication connection with the image forming apparatus 10 to send the wireless network information to the image forming apparatus 10. The wireless network information may include the SSID and the encryption key corresponding to the wireless network device 30.

It should be noted that the wireless network device 30 may include, but may not be limited to, a wireless access point (AP), or a wireless router. The wireless network information may be saved by the operating system of the electronic device 20. The wireless network information may be, for example, the information of the wireless network device 30 to which the image forming apparatus 10 or the electronic device 20 has been connected or last connected. Or the wireless network information may be the information generated based on user operations.

In S120, a preset operation may be executed.

In S120, the electronic device 20, which establishes the keyless communication connection with the image forming apparatus 10 based on the first SSID, may send the wireless network information to the image forming apparatus 10. After receiving the wireless network information, the image forming apparatus 10 may establish the communication connection with a corresponding wireless network device 30 based on the wireless network information, thereby completing quick network connection configuration of the image forming apparatus 10.

Optionally, in S120, after the image forming apparatus 10 receives the wireless network information sent by the electronic device 20, the image forming apparatus 10 may immediately (or after a preset time) stop sending out the first SSID and disconnect the keyless communication connection with the electronic device 20 to prevent other devices from controlling the image forming apparatus 10 through keyless communication.

Optionally, in S120, after the image forming apparatus 10 receives the wireless network information sent by the electronic device 20, if the connection to the wireless network device 30 is successful finally, the image forming apparatus 10 may immediately (or after a preset time) stop sending out the first SSID and disconnect the keyless communication connection with the electronic device 20. Or if the connection to the wireless network device 30 is successful finally, the image forming apparatus 10 may feedback a message of whether the network configuration is successful to the electronic device 20 through the keyless communication connection. After the electronic device 20 receives the message that the network distribution is successful, the electronic device 20 may disconnect the keyless communication with the image forming apparatus 10. After the electronic device 20 disconnects the keyless communication with the image forming apparatus 10, the image forming apparatus 10 may immediately (or after a preset time) stop sending out the first SSID.

Optionally, in S120, after receiving the wireless network information, the image forming apparatus 10 may use the wireless network information to interact with the wireless network device 30. If the connection with the wireless network device 30 is not successfully established, the image forming apparatus 10 may continue to broadcast the first SSID until the image forming apparatus 10 establishes communication with the wireless network device 30 successfully.

Optionally, if the image forming apparatus 10 fails to configure the network due to a preset reason (such as a wrong password) and does not establish connection with the wireless network device 30, the image forming apparatus 10 may continue to broadcast the first SSID until new wireless network information is received again, and the connection with the wireless network device 30 is successfully established.

Optionally, it may configure that the image forming apparatus 10 may stop broadcasting the first SSID after the network configuration fails for a preset time or after several attempts for reconnection.

Optionally, when the image forming apparatus 10 establishes the keyless communication with the electronic device 20, according to the requirement of the electronic device 20, the image forming apparatus 10 may feedback the information of one or more APs (including the AP information of the wireless network device 30) searched by the communication unit to the electronic device 20 through the keyless communication connection. The application program of the electronic device 20 may display a list of APs for the user to select the wireless network device 30. The electronic device 20 may send corresponding wireless network information to the image forming apparatus 10 according to the wireless network device 30 selected by the user. In one embodiment, the AP information that can be searched by the image forming apparatus 10 itself may be fed back to the electronic device 20, such that the AP configured by the user may be currently connectable by the image forming apparatus 10, and the AP selected by the user may be ensured to be connectable by the image forming apparatus 10.

In S130, the second SSID with a corresponding encryption key may be sent out.

In one embodiment, after the communication connection between the image forming apparatus 10 and the wireless network device 30 is completed through S120, the image forming apparatus 10 may send out the second SSID with the corresponding encryption key, such that the electronic device 20, which receives the second SSID, may establish a key communication connection with the image forming apparatus 10 based on the second SSID and the corresponding encryption key.

In other words, after the image forming apparatus 10 establishes the communication connection with the wireless network device 30, the image forming apparatus 10 may stop sending out the first SSID and disconnect the keyless communication connection with the electronic device 20 and may send out the second SSID. Therefore, it may avoid the problem that other electronic devices establish communication connection with the image forming apparatus 10 based on the first SSID which may result in the decrease of the communication security.

The turn-on mechanism for the image forming apparatus 10 to send out the second SSID may not be limited according to embodiments of the present disclosure and may be selected according to actual application requirements. For example, in an optional embodiment, the image forming apparatus 10 may detect in real time whether the image forming apparatus 10 establishes the communication connection with the wireless network device 30 and send out the second SSID when the image forming apparatus 10 is detected to establish the communication connection with the wireless network device 30.

For another example, in another optional embodiment, after the electronic device 20 sends the wireless network information to the image forming apparatus 10, the electronic device 20 may send an instruction to the image forming apparatus 10 after a certain duration, such that the image forming apparatus 10 may sent out the second SSID based on the instruction. Or, the electronic device 20 may also perform a real-time query on the network status of the image forming apparatus 10 after sending the wireless network information to the image forming apparatus 10, and may send an instruction to the image forming apparatus 10 when it is inquired that the image forming apparatus 10 establishes the communication connection with the wireless network device 30, such that the image forming apparatus 10 may send out the second SSID based on the instruction.

It should be noted that, in one embodiment, the communication unit of the image forming apparatus 10 may include the first communication unit and the second communication unit. The first communication unit may be configured to send out the first SSID and the second SSID, such that the image forming apparatus 10 may work in the soft AP mode when the first SSID or the second SSID is sent out to implement a point-to-point connection with the electronic device 20. The second communication unit may be configured to establish the communication connection with the wireless network device 30 through acquired wireless network information, such that the image forming apparatus 10 may work in a station mode (or work-at-station mode).

Furthermore, the soft AP mode and the station mode of the image forming apparatus 10 may be configured accordingly in advance. For example, in an optional embodiment, the image forming apparatus 10 may work in the soft AP mode and the station mode simultaneously.

For another example, in another optional embodiment, the image forming apparatus 10 may only work in the soft AP mode or the station mode at a same moment. For example, as long as the image forming apparatus 10 is connected to the wireless network device and works in the station mode, the image forming apparatus 10 may stop sending out the first SSID and the second SSID.

Figure 4:
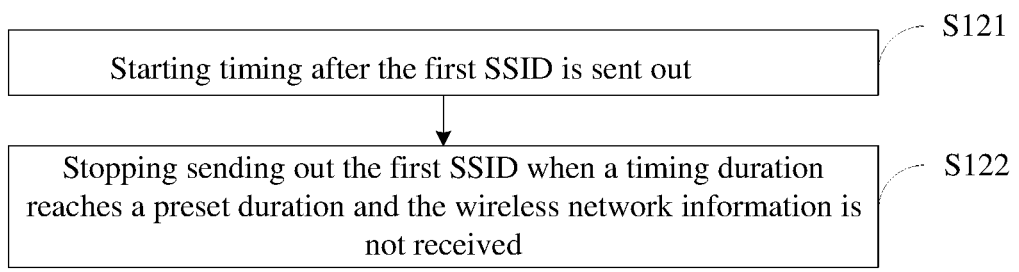
FIG. 4 illustrates a schematic flowchart of sub-steps included in S120 of FIG. 3.

Optionally, executing S120 to complete the preset operation may not be limited according to embodiments of the present disclosure. Based on above-mentioned description and in conjunction with FIG. 4, S120 may include S121 and S122 which are described in detail hereinafter.

In S121, timing may be started after the first SSID is sent out.

In S122, sending out the first SSID may be stopped when the timing duration reaches a preset duration, and the wireless network information is not received.

In one embodiment, in order to avoid the problem that sending the first SSID for a long period of time results in other electronic devices to be easily establish the communication connection with the image forming apparatus 10 based on the first SSID which leads to low connectivity security, timing may be started after the first SSID is sent out, and sending out the first SSID may stopped when the timing duration reaches the preset duration and the wireless network information is not received.

In addition, after the image forming apparatus 10 stops sending out the first SSID, in order to ensure that other electronic devices can also establish the communication connection with the image forming apparatus 10, S130 may be executed to send out the second SSID to establish the corresponding encryption key communication connection.

The value of the preset duration may not be limited according to embodiments of the present disclosure and may be selected according to actual application requirements. For example, the value of the preset duration may include, but may not be limited to, 1 min, 5 min, min, and the like.

It should be noted that, in order to ensure that the electronic device 20 can establish the communication connection with the image forming apparatus 10 through the first SSID timely and send the wireless network information to the image forming apparatus 10 timely, which may avoid the problem that the communication connection with the wireless network device 30 fails to be established due to the first SSID being stopped sending out after reaching the preset duration, the first SSID may also be configured accordingly (e.g., a preset character or number is configured in the first SSID) in one embodiment. Therefore, the electronic device 20 may effectively identify the first SSID; and after identifying the first SSID, the electronic device 20 may immediately establish the keyless communication connection with the image forming apparatus 10 and immediately send the wireless network information to the image forming apparatus 10.

Figure 5:
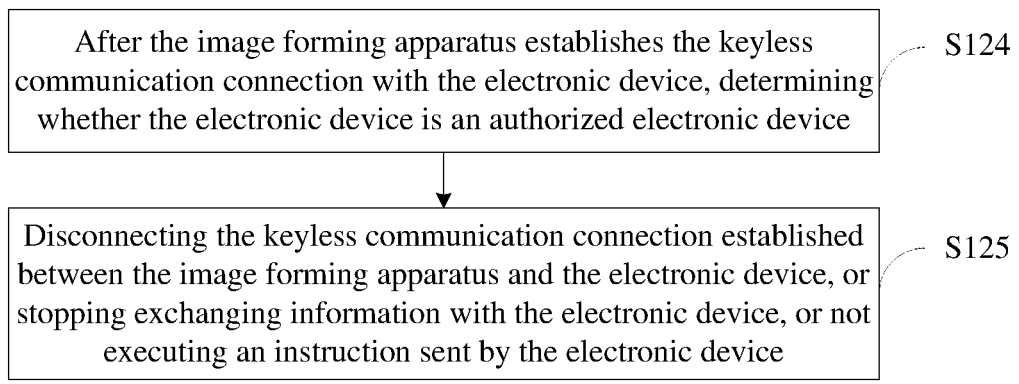
FIG. 5 illustrates a schematic flowchart of other sub-steps included in S120 of FIG. 3.

Furthermore, in order to improve the security of the communication between the electronic device 20 and the image forming apparatus 10 and prevent other electronic devices from arbitrarily operating the image forming apparatus 10, the preset operation may further include a security verification operation. For example, referring to FIG. 5, in one embodiment, S120 may further include S124 and S125 which are described in detail hereinafter.

In S124, after the image forming apparatus 10 establishes the keyless communication connection with the electronic device 20, whether the electronic device 20 is an authorized electronic device may be determined.

In S124, after the image forming apparatus 10 establishes the keyless communication connection with the electronic device 20, the manner of determining whether the electronic device 20 is an authorized electronic device may be determining whether verification information sent by the electronic device 20 is received. For example, when the verification information sent by the electronic device 20 is not received (i.e., the electronic device 20 is not an authorized electronic device), S125 may be executed.

If the trigger instruction is sent by the electronic device 20, the verification information and the trigger instruction may be sent as a data packet through the electronic device or the verification information may be separately sent through a data packet different from that of the trigger instruction.

Furthermore, the content of the verification information may not be limited according to embodiments of the present disclosure and may be selected according to actual application requirements. For example, the verification information may include, but may not be limited to, one or a combination of the serial number of the driver installed on the electronic device 20, the device information (e.g., device name) of the electronic device 20, and a security code. The security code may be randomly generated or preset.

It should be noted that in above-mentioned description of "one or a combination", "combination" may refer to two or more components.

In addition, for example, determining whether the electronic device 20 is an authorized electronic device may also be determined based on that the image forming apparatus actively inquires the electronic device 20 to obtain the verification information such as the device information of the electronic device 20, or the serial number, or security code of the driver, and/or the like. If the verification information returned by the electronic device 20 is not verified by the image forming apparatus 10, the image forming apparatus 10 may determine that the electronic device 20 is not an authorized electronic device, and S125 may be executed.

In S125, the keyless communication connection established between the image forming apparatus 10 and the electronic device 20 may be disconnected or exchanging information with the electronic device 20 may be stopped, or the instruction sent by the electronic device 20 may not be executed.

In one embodiment, when it is determined, through S124, that the verification information sent by the electronic device 20 is not received or the image forming apparatus 10 does not approve the verification information sent by the electronic device 20, the security of the electronic device 20 may be determined to be low. Therefore, it may choose to disconnect the keyless communication connection established with the electronic device 20, or not respond to the instruction sent by the electronic device 20, or not perform further information exchange with the electronic device 20.

It should be noted that the instruction refers to any instruction sent by the electronic device 20, for example, may be a query instruction to read the status information of the image forming apparatus 10. Through S125, it can be ensured that only the electronic device 20 that has passed the verification may further send wireless network information to the image forming apparatus 10, and then configure the network connection of the image forming apparatus 10, which may prevent the problem that electronic devices, which have not passed the security verification, randomly send wireless network information to the image forming apparatus 10, resulting in the image forming apparatus 10 to arbitrarily switch connected wireless routers.

Figure 6:
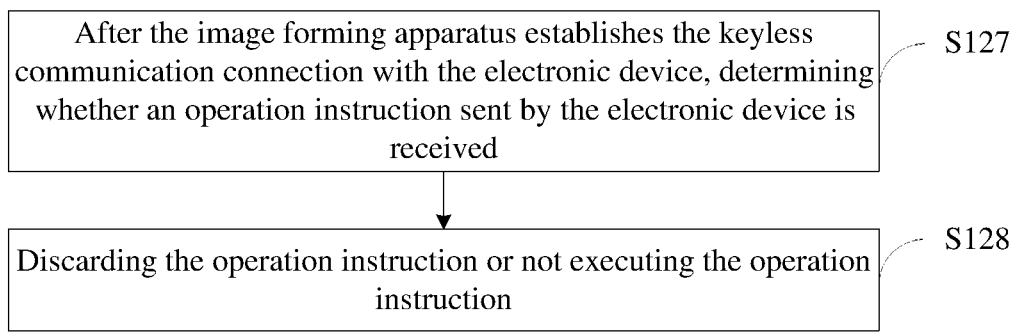
FIG. 6 illustrates a schematic flowchart of other sub-steps included in S120 of FIG. 3.

In order to further improve the security of the communication between the image forming apparatus 10 and the electronic device 20 and prevent the electronic device 20 from arbitrarily operating the image forming apparatus 10 in the configuration network of the image forming apparatus 10, referring to FIG. 6, S120 may further include S127 and S128 in one embodiment which are described in detail hereinafter.

In S127, after the image forming apparatus 10 establishes the keyless communication connection with the electronic device 20, whether an operation instruction sent by the electronic device 20 is received may be determined.

In one embodiment, after the image forming apparatus 10 establishes the keyless communication connection with the electronic device 20, it may be determined whether the operation instruction sent by the electronic device 20 (e.g., other instructions not related to the wireless network information) is received; and if the operation instruction sent by the electronic device 20 is received, S128 may be executed.

In S128, the operation instruction may be discarded, or the operation instruction may not be executed.

In one embodiment, when it is determined through S128 that the operation instruction sent by the electronic device 20 is received, the operation instruction may be directly discarded, or the operation instruction may not be executed.

In other words, among various instructions or information sent by the electronic device 20 which establishes the keyless communication connection with the image forming apparatus 10 based on the first SSID, the image forming apparatus 10 may receive the wireless network information to configure the network connection (i.e., when the image forming apparatus 10 establishes the keyless communication connection with the electronic device 20, only network configuration may be performed), and other operation instructions (e.g., query instructions) may not be executed, thereby ensuring the security of the image forming apparatus 10.

Figure 7:
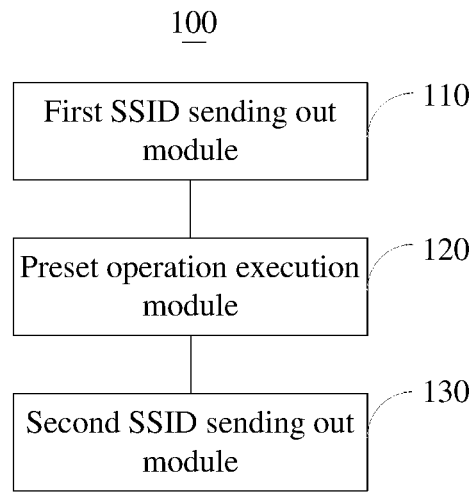
FIG. 7 illustrates a schematic block diagram of functional modules included in a network connection configuration apparatus according to various exemplary embodiments of the present disclosure.

Referring to FIG. 7, embodiments of the present disclosure also provide a network connection configuration apparatus 100 which can be applied to above-mentioned image forming apparatus 10. The network connection configuration apparatus 100 may include a first SSID sending out module 110, a preset operation execution module 120, and a second SSID sending out module 130.

The first SSID sending out module 110 may be configured to send out the first SSID without the corresponding encryption key, such that the electronic device 20 which receives the first SSID may establish the keyless communication connection with the image forming apparatus 10 based on the first SSID. In one embodiment, the first SSID sending out module 110 may be configured to execute S110 shown in FIG. 3, and related content of the first SSID sending out module 110 may refer to above-mentioned description of S110.

The preset operation execution module 120 may be configured to execute the preset operation. The preset operation may include acquiring the wireless network information sent by the electronic device 20 which establishes the keyless communication connection with the image forming apparatus 10 and establishing the communication connection with the corresponding wireless network device 30 based on the wireless network information. In one embodiment, the preset operation execution module 120 may be configured to execute S120 shown in FIG. 3, and related content of the preset operation execution module 120 may refer to above-mentioned description of S120.

The second SSID sending out module 130 may be configured to send out the second SSID with the corresponding encryption key, such that the electronic device 20, which receives the second SSID, may establish the key communication connection with the image forming apparatus 10 based on the second SSID and the corresponding encryption key. When the second SSID is sent out, the image forming apparatus 10 may disconnect the keyless communication connection with the electronic device 20. In one embodiment, the second SSID sending out module 130 may be configured to execute S130 shown in FIG. 3, and related content of the second SSID sending out module 130 may refer to above-mentioned description of S130.

Figure 8:
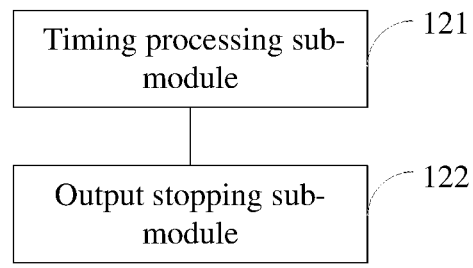
FIG. 8 illustrates a schematic block diagram of functional modules included in a preset operation execution module according to various exemplary embodiments of the present disclosure.

Referring to FIG. 8, in one embodiment, the preset operation execution module 120 may include a timing processing sub-module 121 and an output stopping sub-module 122.

The timing processing sub-module 121 may be configured to start timing after sending out the first SSID. In one embodiment, the timing processing sub-module 121 may be used to execute S121 shown in FIG. 4, and related content of the timing processing sub-module 121 may refer to above-mentioned description of S121.

The output stopping sub-module 122 may be configured to stop sending out the first SSID when the timing duration reaches the preset duration, and the wireless network information is not received. In one embodiment, the output stopping sub-module 122 may be configured to execute S122 shown in FIG. 4, and related content of the output stopping sub-module 122 may refer to above-mentioned description of S122.

Figure 9:
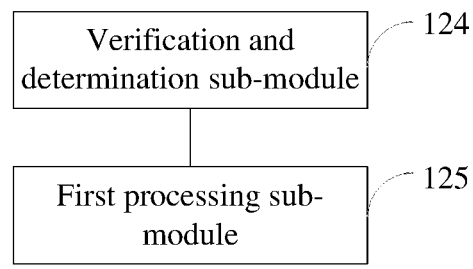
FIG. 9 illustrates a schematic block diagram of other functional modules included in a preset operation execution module according to various exemplary embodiments of the present disclosure.

Referring to FIG. 9, in one embodiment, the preset operation execution module 120 may further include a verification and determination sub-module 124 and a first processing sub-module 125.

The verification and determination sub-module 124 may be configured to determine whether the electronic device 20 is an authorized electronic device after the image forming apparatus 10 and the electronic device 20 establish the keyless communication connection. In one embodiment, the verification and determination sub-module 124 may be configured to execute S124 shown in FIG. 5, and related content of the verification and determination sub-module 124 may refer to above-mentioned description of S124.

The first processing sub-module 125 may be configured to disconnect the keyless communication connection established between the image forming apparatus 10 and the electronic device 20 when the electronic device 20 is not an authorized electronic device, or stop exchanging information with the electronic device 20, or not execute the instruction sent by the electronic device 20. In one embodiment, the first processing sub-module 125 may be configured to execute S125 shown in FIG. 5, and related content of the first processing sub-module 125 may refer to above-mentioned description of S125.

Figure 10:
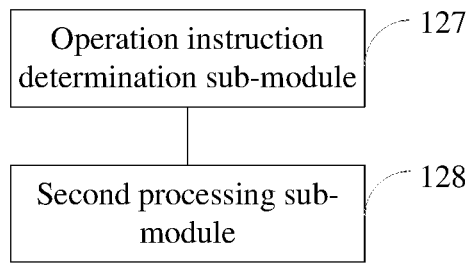
FIG. 10 illustrates another schematic block diagram of other functional modules included in a preset operation execution module according to various exemplary embodiments of the present disclosure.

Referring to FIG. 10, in one embodiment, the preset operation execution module 120 may further include an operation instruction determination sub-module 127 and a second processing sub-module 128.

The operation instruction determination sub-module 127 may be configured to determine whether an operation instruction sent by the electronic device 20 is received after the image forming apparatus 10 and the electronic device 20 establish the keyless communication connection. In one embodiment, the operation instruction determination sub-module 127 may be configured to execute S127 shown in FIG. 6, and related content of the operation instruction determination sub-module 127 may refer to above-mentioned description of S127.

The second processing sub-module 128 may be configured to discard the operation instruction or not execute the operation instruction when the operation instruction is received. In one embodiment, the second processing sub-module 128 may be configured to execute S128 shown in FIG. 6, and related content of the second processing sub-module 128 may refer to above-mentioned description of S128.

Furthermore, in one embodiment, the network connection configuration apparatus 100 may further include a trigger instruction acquisition module, a communication connection establishing module, and/or a trigger instruction generation module.

The communication connection establishing module may be configured to establish the communication connection with the electronic device 20 via sending out the second SSID, or via a USB interface, a wired network interface, or other wireless connection manners, such that the electronic device 20 may send the trigger instruction to the image forming apparatus 10. The trigger instruction generating module may be configured to generate the trigger instruction in response to a user operation through the control panel of the image forming apparatus 10. The trigger instruction acquisition module may be configured to acquire the trigger instruction, such that the image forming apparatus 10 may send out the first SSID without the corresponding encryption key based on the trigger instruction.

In embodiments of the present disclosure, corresponding to the network connection configuration method shown in FIGS. 3-6, a computer-readable storage medium may also be provided. Computer programs may be stored in the computer-readable storage medium, and each step of above-mentioned network connection configuration method may be performed when executing the computer programs.

Performing each step when executing the computer programs may not be described in detail herein, and reference may be made to the previous description of the network connection configuration method.

As disclosed, in the network connection configuration method, the network connection configuration apparatus 100, the image forming apparatus 10, and the storage medium provided by the present disclosure, the electronic device 20 may establish the keyless communication connection with the image forming apparatus 10 through sending out the first SSID without the corresponding encryption key, which ensures that the image forming apparatus may be connected to the electronic device 20 quickly and conveniently to receive the wireless network information and establish the communication connection with the wireless network device 30, thereby avoiding the poor experience problem in the existing technology due to the need for the user to perform corresponding connection operations. In addition, after the image forming apparatus 10 establishes the communication connection with the wireless network device 30, the second SSID with the corresponding encryption key may be sent out to replace the first SSID, such that the electronic device 20 and the image forming apparatus 10 establish the key communication connection to ensure the security of the communication connection between the image forming apparatus 10 and the electronic device 20, which may have extremely high practicability.

In one embodiment shown in FIG. 3, after the first SSID is sent out, the image forming apparatus 10 may establish the keyless communication connection with the electronic device 20; the second SSID may be sent out after performing the preset operation; and when the second SSID is sent out, the image forming apparatus 10 may disconnect the keyless communication connection with the electronic device 20. In one embodiment of the present disclosure, sending the second SSID may be not limited to after sending the first SSID.

Figure 11:
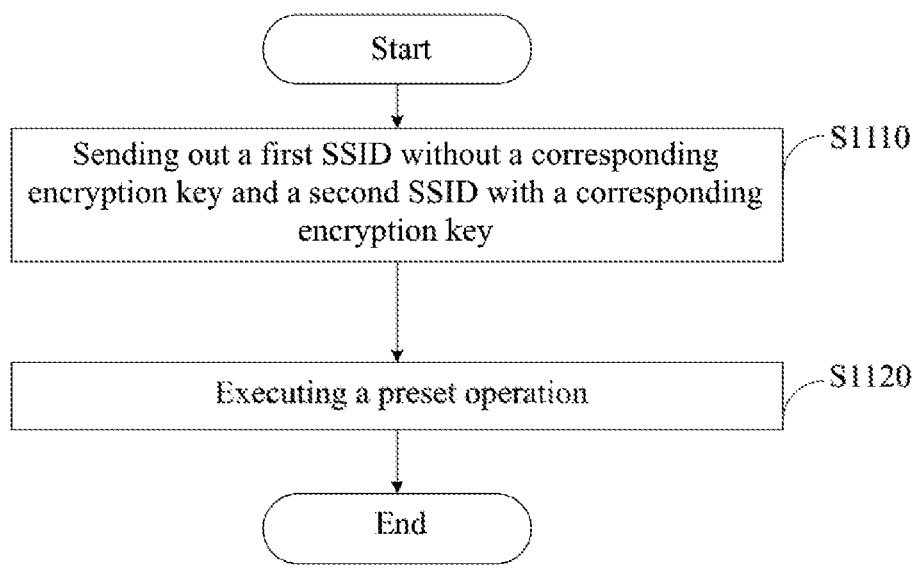
FIG. 11 illustrates a schematic flowchart of a network connection configuration method according to various exemplary embodiments of the present disclosure.

FIG. 11 illustrates an implementation flowchart of a network connection configuration method according to various exemplary embodiments of the present disclosure.

The process shown in FIG. 11 is described in detail hereinafter.

In S1110, the image forming apparatus 10 may send out the first SSID without a corresponding encryption key and the second SSID with a corresponding encryption key.

In S1120, a preset operation may be performed. S1120 may refer to above S120.

In S1110, sending the first SSID may refer to S110, and sending the second SSID may refer to S130.

Optionally, in S1110, the communication unit of the image forming apparatus 10 in embodiments of the present disclosure may simultaneously send out the first SSID and the second SSID.

For example, the image forming apparatus 10 may be configured with a first Wi-Fi chip and a second Wi-Fi chip; the first Wi-Fi chip may broadcast the first SSID; and the second Wi-Fi chip may broadcast the second SSID. When the user's mobile phone searches for the image forming apparatus 10 through Wi-Fi, the first SSID and the second SSID may be obtained simultaneously. Optionally, the Wi-Fi chip configured in the image forming apparatus 10 may be set to send out at least two different SSIDs. The Wi-Fi chip configured in the image forming apparatus 10 may send out multiple SSIDs, which may be to send out multiple SSIDs simultaneously, or may be to send out different SSIDs alternately.

For another example, when the Wi-Fi chip of the image forming apparatus 10 sends out the first SSID, the broadcast packet of the first SSID may also carry the second SSID; or when the Wi-Fi chip of the image forming apparatus 10 sends out the second SSID, the broadcast packet of the second SSID may also carry the first SSID. For example, a private field may be added and the second SSID may be filled in the broadcast packet of the first SSID (such as beacon); or a private field may be added and the first SSID may be filled in the broadcast packet of the second SSID (such as beacon). When searching for the image forming apparatus 10 through Wi-Fi, the electronic device 20 may obtain the second SSID by analyzing the broadcast packet of the first SSID; or the first SSID may be obtained by analyzing the broadcast packet of the second SSID, such that the first SSID and the second SSID may be obtained simultaneously.

For another example, the first SSID and the second SSID may be set according to a naming rule, and the Wi-Fi chip of the image forming apparatus 10 may send out the first SSID or the second SSID. When the first SSID is found by the electronic device 20 through search, corresponding application program on the electronic device 20 may also obtain the second SSID from the first SSID according to the naming rule. When the second SSID is found by search, the first SSID may be obtained according to the naming rule.

For example, the naming rules of the first SSID and the second SSID may be set as XXX-ID12345-01 and XXX-ID12345-02. The Wi-Fi chip of the image forming apparatus 10 may send out XXX-ID12345-01 or XXX-ID12345-02. When the electronic device 20 finds for XXX-ID12345-01 (first SSID) by search, the electronic device 20 may generate XXX-ID12345-02 (second SSID) according to XXX-ID12345-01; similarly, when the electronic device 20 finds XXX-ID12345-02 (second SSID) by search, the electronic device 20 may generate XXX-ID12345-01 (first SSID) according to XXX-ID12345-02.

Optionally, through software implementation, the Wi-Fi chip of the image forming apparatus 10 may be set to broadcast the first SSID or the second SSID, instead of sending out the first SSID and the second SSID simultaneously. Optionally, the Wi-Fi chip of the image forming apparatus 10 may send out the first SSID and the second SSID simultaneously on a hardware basis, and the Wi-Fi chip may send out the first SSID or the second SSID through software implementation.

Optionally, the communication unit of the image forming apparatus 10 in embodiments of the present disclosure may send out the first SSID and the second SSID alternately.

For example, the internal Wi-Fi chip of the image forming apparatus 10 may be implemented by software, such that the Wi-Fi chip of the image forming apparatus 10 may alternately and repeatedly broadcast the first SSID and the second SSID. For example, the driver of the Wi-Fi chip may be controlled to generate the first SSID for broadcasting for a few seconds (for example, 1 second), and then generate the second SSID for broadcasting; and such process, i.e., including generation and broadcast of the first SSID and generation and broadcast the second SSID, may be repeated.

After S1110, the electronic device 20 may obtain the first SSID and the second SSID. The electronic device 20 may display the first SSID and the second SSID in the search list.

Optionally, when the electronic device 20 searches and finds two SSIDs sent by the image forming apparatus 10, the electronic device 20 may simultaneously display two SSIDs in the search list. Any SSID selected by the user may further implement the transmission of wireless network information from the control terminal to the image forming apparatus 10 through keyless communication.

For example, when the user clicks the SSID in the search list, if current application scenario is "transmitting wireless network information to the image forming apparatus 10", regardless of whether the user clicks the first SSID or the second SSID, the electronic device 20 may invoke the first SSID, and based on the first SSID, transmits wireless network information to the image forming apparatus 10 through keyless communication.

For example, the user may open a relevant APP for configuring the wireless network of the printer on the electronic device 20 or start to configure the wireless network of the printer in the APP. In the running scenario of the APP, the electronic device 20 may search the image forming apparatus 10 through Wi-Fi and obtain the first SSID and the second SSID. The electronic device 20 may simultaneously display the first SSID and the second SSID in the search list. When the user clicks one of the first SSID and the second SSID in the search list, the electronic device 20 may invoke the first SSID, and transmit wireless network information to the image forming apparatus 10 through keyless communication based on the first SSID.

For example, when the user selects the SSID displayed in the search list, the electronic device 20 may determine whether the user selected is the first SSID. If the electronic device 20 determines that the user selected the first SSID, the electronic device 20 may transmit the wireless network information to the image forming apparatus 10 through keyless communication based on the first SSID selected by the user. If the electronic device 20 determines that the user selected the second SSID, the electronic device 20 may determine the first SSID corresponding to the second SSID based on the second SSID selected by the user. The electronic device 20 may transmit wireless network information to the image forming apparatus 10 through keyless communication based on the first SSID.

Optionally, when the electronic device 20 searches and finds two SSIDs sent by the image forming apparatus 10, the electronic device 20 may display one of two SSIDs in the search list. The user selects the SSID displayed in the search list, such that it may further implement that the wireless network information is transmitted from the electronic device 20 to the image forming apparatus 10 through keyless communication.

For example, when the user selects the SSID of the image forming apparatus 10 in the search list, if current application scenario is "transmitting wireless network information to the image forming apparatus 10", the electronic device 20 may invoke the first SSID, and based on the first SSID, transmit wireless network information to the image forming apparatus 10 through keyless communication.

Optionally, when the electronic device 20 obtains two SSIDs sent by the image forming apparatus 10, according to current application scenario, the electronic device 20 may select an SSID corresponding to current application scenario and displays it in the search list.

For example, when the control terminal obtains two SSIDs sent by the image forming apparatus 10, if current application scenario is "transmitting wireless network information to the image forming apparatus 10", the control terminal may display the first SSID in the search list.

Optionally, when the electronic device 20 obtains two SSIDs sent by the image forming apparatus 10, the electronic device 20 may randomly select any one of two SSIDs to display in the search list. When the user selects the SSID displayed in the search list, the electronic device 20 may determine whether the user selected is the first SSID. If the electronic device 20 determines that the user selected the first SSID, the electronic device 20 may transmit the wireless network information to the image forming apparatus 10 through keyless communication based on the first SSID selected by the user. If the electronic device 20 determines that the user selected the second SSID, the electronic device 20 may determine the first SSID corresponding to the second SSID based on the second SSID selected by the user. The electronic device 20 may transmit wireless network information to the image forming apparatus through keyless communication based on the first SSID.

Optionally, when the electronic device 20 obtains two SSIDs sent by the image forming apparatus 10, the electronic device 20 may select the second SSID of two SSIDs to display in the search list, thereby hiding the first SSID without a corresponding encryption key and improving network security.

When the electronic device 20 displays the first SSID and/or the second SSID in the search list, and the electronic device 20 invokes the first SSID, the electronic device 20 may distinguish the first SSID and the second SSID based on various manners.

Optionally, the electronic device 20 may distinguish the first SSID and the second SSID according to the naming rule; and the electronic device 20 may, according to the naming rule, determine the first SSID corresponding to the second SSID based on the second SSID selected by the user.

For example, the naming rules of the first SSID and the second SSID may be set as XXX-ID12345-01 and XXX-ID12345-02. The electronic device 20 may determine whether the SSID is the first SSID or the second SSID according to whether last two characters of the SSID is 01 or 02.

The electronic device 20 may also, according to the field "ID12345" in the second SSID "XXX-ID12345-02", determine that "XXX-ID12345-01" containing same field is the first SSID corresponding to the second SSID "XXX-ID12345-02".

Optionally, the electronic device 20 may also distinguish the first SSID and the second SSID according to the source of the SSID and determine the first SSID corresponding to the second SSID according to the source of the SSID. For example, the image forming apparatus 10 may be configured to broadcast the first SSID and carry the second SSID in the broadcast packet of the first SSID.

When the electronic device 20 searches the image forming apparatus 10 through Wi-Fi, the first SSID may be obtained; and the electronic device 20 may analyze the broadcast packet of the first SSID to obtain the second SSID. Therefore, the electronic device 20 may distinguish the first SSID and the second SSID through different SSID obtaining manners and determine correspondence between the second SSID and the first SSID.

Optionally, the electronic device 20 may also distinguish the first SSID and the second SSID according to additional information of the SSID. For example, the image forming apparatus 10 may be configured to alternately broadcast the first SSID and the second SSID. The broadcast packet of the first SSID may carry the first description information, and the first description information may be used to describe that the SSID corresponding to current broadcast packet is the first SSID; and the broadcast packet of the second SSID may carry second description information, and the second description information may be used to describe that the SSID corresponding to current broadcast packet is the second SSID. The electronic device 20 may distinguish the first SSID and the second SSID through the description information in received broadcast packet.

The additional information of the SSID may also include correspondence between the first SSID and the second SSID. The electronic device 20 may determine the first SSID corresponding to the second SSID through the description information in received broadcast packet.

Optionally, the electronic device 20 may also determine the first SSID and the second SSID corresponding to each other according to whether different SSIDs belong to a same device. If two different SSIDs belong to the same device (image forming apparatus 10), two different SSIDs may be the first SSID and the second SSID corresponding to each other. For example, when the image forming apparatus 10 is used as the AP, the Wi-Fi chip inside the image forming apparatus 10 may periodically send out beacon frames at a certain time interval. The electronic device 20 may determine the source of received SSID according to the information carried in the beacon frame; and when it is found that two SSIDs are sent from the same device, determine that two different SSIDs are the first SSID and the second SSID corresponding to each other.

Optionally, in another embodiment, the image forming apparatus 10 may also determine whether the first SSID is sent and whether the second SSID is sent according to current network connection status.

For example, when the image forming apparatus 10 is turned on, it may detect whether the communication unit has connected to an AP; and if the communication unit has connected to the AP, the communication unit of the image forming apparatus 10 may send out the second SSID. When the image forming apparatus 10 is not connected to any AP when being turned on, the communication unit may send out the first SSID or simultaneously (or alternately) send out the first SSID and the second SSID. In such way, after establishing keyless communication according to the first SSID, the other devices may send wireless network information to the image forming apparatus 10, so that the image forming apparatus 10 may be connected to a target AP.

Optionally, in another embodiment, after S1110, if the electronic device 20 establishes the key communication connection with the image forming apparatus 10 based on the second SSID, the electronic device 20 may also establish the keyless communication connection with the image forming apparatus 10 again based on the first SSID, so that the image forming apparatus 10 may subsequently execute S1120.

For example, after S1110, the electronic device 20 may determine that current application scenario is not "transmitting wireless network information to the image forming apparatus 10". After the user selects the first SSID or the second SSID displayed in the search list, the electronic device 20 may invoke the second SSID and establish the key communication connection with the image forming apparatus 10 based on the second SSID.

After the electronic device 20 establishes the key communication connection with the image forming apparatus 10 based on the second SSID, the image forming apparatus 10 may optionally continue to send out the first SSID (or continue to send out the first SSID and the second SSID).

After the electronic device 20 determines that current application scenario is switched to "transmitting wireless network information to the image forming apparatus 10" (for example, the user opens a relevant APP or functional interface for configuring the printer's wireless network on the electronic device 20), the electronic device 20 may disconnect the key communication connection with the image forming apparatus 10. The electronic device 20 may search the image forming apparatus 10 wirelessly again to obtain the first SSID and establish the keyless communication connection with the image forming apparatus 10 based on the first SSID.

For another example, after S1110, the electronic device 20 determines that current application scenario is not "transmitting wireless network information to the image forming apparatus 10". After the user selects the first SSID or the second SSID displayed in the search list, the electronic device 20 may invoke the second SSID and establish the key communication connection with the image forming apparatus 10 based on the second SSID.

After the electronic device 20 establishes the key communication connection with the image forming apparatus 10 based on the second SSID, the image forming apparatus 10 may choose to stop sending out the first SSID.

After the electronic device 20 determines that current application scenario is switched to "transmitting wireless network information to the image forming apparatus 10" (for example, the user opens the relevant APP for configuring the wireless network of the printer on the electronic device 20), the electronic device 20 may send an obtaining request for the first SSID to the image forming apparatus 10 through the key communication connection with the image forming apparatus 10.

After receiving the obtaining request for the first SSID, the image forming apparatus 10 may feedback the first SSID to the electronic device 20 through the key communication connection with the electronic device 20. After receiving the first SSID, the electronic device 20 may disconnect the key communication connection with the image forming apparatus 10 and establish the keyless communication connection with the image forming apparatus 10 based on the first SSID.

Or after the image forming apparatus 10 receives the obtaining request for the first SSID, the image forming apparatus 10 may stars broadcasting and sending the first SSID and feedback the information sending identification to the electronic device 20 through the key communication connection with the electronic device 20. After receiving the information transmission identification, the electronic device 20 may disconnect the key communication connection with the image forming apparatus 10, search the image forming apparatus 10 wirelessly again to obtains the first SSID, and establish the keyless communication connection with the image forming apparatus 10 based on the first SSID.

Optionally, in another embodiment, in order to allow the image forming apparatus to further implement connection to different objects, or to enable the image forming apparatus to implement different functions according to connections of different SSIDs, the Wi-Fi chip of the image forming apparatus 10 may be designed to broadcast at least two SSIDs simultaneously.

Optionally, when the Wi-Fi chip of the image forming apparatus 10 sends out at least two SSIDs simultaneously, the application program of the electronic device 20 may determine whether multiple SSIDs are sent out by the same device. If there are multiple SSIDs sent by the same device, one of the SSIDs may be optionally selected, which may not confuse the user which SSID should be chosen.

Optionally, when the image forming apparatus 10 can send out at least two SSIDs, the image forming apparatus 10 may not send out all SSIDs. That is, one or more SSIDs of the image forming apparatus 10 may be set in a hidden state. When the electronic device 20 searches the image forming apparatus 10, not all SSIDs may be found by search. The electronic device 20 may obtain other SSIDs set to a hidden state according to the SSID sent out by the image forming apparatus 10.

By setting one or more SSIDs to be hidden, specific SSIDs may be prevented from being obtained by other electronic devices other than the electronic device 20, thereby improving network security.

Furthermore, the electronic device 20 may only display searched SSID on the display interface. When the user selects the SSID displayed on the electronic device 20, the electronic device 20 may establish communication connection according to current application scenario based on the SSID selected by the user or establish communication connection according to other SSIDs set as hidden, which correspond to current application scenario and are obtained based on the SSID selected by the user.

By setting one or more SSIDs to be hidden, it may prevent the user from being confused by displaying multiple SSIDs when the electronic device 20 searches the image forming apparatus 10.

Optionally, when the image forming apparatus 10 is capable of sending out at least two SSIDs including the first SSID, the image forming apparatus 10 may be configured not to send out the first SSID. That is, the first SSID of the image forming apparatus 10 may be set in a hidden state. When the electronic device 20 searches the image forming apparatus 10, the first SSID cannot be found.

In the case where the application scenario of the electronic device 20 is "transmitting wireless network information to the image forming apparatus 10", the electronic device 20 may obtain the first SSID according to other SSIDs sent out by the image forming apparatus 10 based on a preset rule (above embodiment has described mutual obtaining rule between SSIDs). The establishment of the keyless communication connection may be requested to the image forming apparatus 10 based on the first SSID, and wireless network information may be transmitted to the image forming apparatus 10 through the keyless communication connection.

By setting the first SSID to be hidden, the first SSID without a corresponding encryption key may be prevented from being obtained by other electronic devices than the electronic device 20, thereby improving network security.

For example, the image forming apparatus 10 may send out the first SSID and the second SSID (the Wi-Fi chip of the image forming apparatus may be set to broadcast the first SSID and the second SSID). The image forming apparatus 10 may broadcast the second SSID to the outside and may not broadcast the first SSID. When the electronic device 20 searches the image forming apparatus 10, the second SSID may be found by search but the first SSID may not be found by search.

The electronic device 20 may display the second SSID in the search list. In the case where the application scenario of the electronic device 20 is "transmitting wireless network information to the image forming apparatus 10", when the user selects the second SSID in the search list, the electronic device 20 may obtain the first SSID according to the second SSID. The electronic device 20 may request establishment of the keyless communication connection with the image forming apparatus 10 based on the first SSID. The electronic device 20 may transmit wireless network information to the image forming apparatus 10 based on the keyless communication connection.

An application scenario where the electronic device 20 is a mobile phone and the image forming apparatus 10 is a printer may be taken as an example. In one embodiment, an APP that the printer is configured as a wireless hotspot may be installed on the mobile phone. After opening the APP on the mobile phone, the user may find that no printer is connected.

When the user enters the peripheral device search page while the APP is open, the mobile phone may search and find the second SSID sent by the printer and display the second SSID in the search list. After the user selects the second SSID in the search list, the electronic device 20 may pop up an input box, prompting the user to input wireless network information (such as the SSID and password of the router). After the user enters the wireless network information, the wireless network information may be sent to the printer. The printer may be connected to the router based on the wireless network information.

After above user enters the wireless network information, in the process that the wireless network information is sent to the printer, the mobile phone may obtain the first SSID according to the second SSID and establish the keyless communication connection with the printer based on the first SSID request. The process of the mobile phone transmitting wireless network information to the printer based on the keyless communication connection may not be perceived by the user. The user may perceive that the second SSID is displayed for the search page. After selecting the second SSID, the wireless network information input interface may be displayed. After entering the wireless network information, the mobile phone may be connected to the printer as a wireless hotspot. Furthermore, the electronic device 20 may obtain the first SSID according to the second SSID in various manners.

In one embodiment, when the user selects the second SSID in the search list, the electronic device 20 may generate the first SSID according to the second SSID. For example, the first SSID may be generated according to the second SSID through a preset naming rule. For another example, corresponding first SSID may be found according to the second SSID through prestored SSID correspondence table.

After obtaining the first SSID, the electronic device 20 may send a detection frame to the image forming apparatus 10. The detection frame may carry the first SSID, which is used to request to establish the keyless communication connection with the image forming apparatus 10. After the image forming apparatus 10 responds to the detection frame, the electronic device 20 may transmit the wireless network information to the image forming apparatus 10 based on the keyless communication connection.

In another embodiment, when the user selects the second SSID in the search list, the electronic device 20 may establish the key communication connection with the image forming apparatus 10 based on the second SSID and corresponding encryption key. The electronic device 20 may send instruction information to the image forming apparatus 10 based on the key communication connection. The instruction information may be configured to instruct the image forming apparatus 10 to start broadcasting the first SSID, so that the electronic device 20 or other electronic devices may search and find the first SSID when searching the image forming apparatus 10.

After finding the first SSID by search, the electronic device 20 or other electronic devices may request to establish the keyless communication connection with the image forming apparatus 10 based on the first SSID and transmit the wireless network information to the image forming apparatus 10 based on the keyless communication connection.

After the image forming apparatus 10 receives the wireless network information or establishes a communication connection with the wireless network device 30 based on the wireless network information, the image forming apparatus 10 may stop broadcasting the first SSID, so that the first SSID may be hidden again.

In another embodiment, an image forming apparatus is provided in the present disclosure. The image forming apparatus includes a memory, for storing computer-executable instructions; and at least one processor, coupled with the memory and configured, when the computer-executable instructions being executed, to perform a network connection configuration method. The method includes sending out first network identification information without a corresponding encryption key and second network identification information with a corresponding encryption key, such that a first terminal device receives the first network identification information and the second network identification information, where the first network identification information is configured to enable the first terminal device to establish a keyless communication connection with the image forming apparatus based on the first network identification information, and the second network identification information is configured to enable the first terminal device to establish a key communication connection with the image forming apparatus based on the second network identification information with the corresponding encryption key; during a state of sending out the first network identification information and the second network identification information, monitoring whether a request is received to establish the keyless communication connection based on the first network identification information; when the request is received from the first terminal device to establish the keyless communication connection based on the first network identification information, establishing the keyless communication connection with the first terminal device; obtaining wireless network information sent by the first terminal device based on the keyless communication connection; and establishing a communication connection with a corresponding wireless network device based on the wireless network information.

Optionally, the processor is further configured to send out the first network identification information and the second network identification information simultaneously or alternately.

Optionally, the processor is further configured to determine whether the image forming apparatus is connected to a wireless network device; and when the image forming apparatus is not connected to the wireless network device, send out the first network identification information.

In another embodiment, an image forming apparatus is provided. The image forming apparatus includes a memory, for storing computer-executable instructions; and at least one processor, coupled with the memory and configured, when the computer-executable instructions being executed, to perform a network connection configuration method. The method includes sending out first network identification information without a corresponding encryption key and second network identification information with a corresponding encryption key, such that a first terminal device receives the first network identification information and the second network identification information, where the first network identification information is configured to enable the first terminal device to establish a keyless communication connection with the image forming apparatus based on the first network identification information, and the second network identification information is configured to enable the first terminal device to establish a key communication connection with the image forming apparatus based on the second network identification information with the corresponding encryption key; during a state of sending out the first network identification information and the second network identification information, monitoring whether a request is received to establish the keyless communication connection based on the first network identification information; when the request is received from the first terminal device to establish the keyless communication connection based on the first network identification information, establishing the keyless communication connection with the first terminal device; obtaining wireless network information sent by the first terminal device based on the keyless communication connection; and establishing a communication connection with a corresponding wireless network device based on the wireless network information.

In one embodiment, a network connection configuration method, applied to a terminal device, is provided in the present disclosure. The method includes searching an image forming apparatus and obtaining first network identification information without a corresponding encryption key and second network identification information with a corresponding encryption key which are sent out by the image forming apparatus, where the first network identification information is configured to enable the terminal device to establish a keyless communication connection with the image forming apparatus based on the first network identification information, and the second network identification information is configured to enable the terminal device to establish a key communication connection with the image forming apparatus based on the second network identification information with the corresponding encryption key; establishing the keyless communication connection with the image forming apparatus based on the first network identification information; and after establishing the keyless communication connection with the image forming apparatus, transmitting wireless network information to the image forming apparatus based on the keyless communication connection, where the wireless network information is configured to enable the image forming apparatus to establish a communication connection with a corresponding wireless network device based on the wireless network information.

Optionally, before establishing the keyless communication connection with the image forming apparatus based on the first network identification information, the method further includes after obtaining the first network identification information and the second network identification information, displaying the first network identification information and the second network identification information respectively in a search list; and when the user selects the first network identification information or the second network identification information in the search list, and current application scenario is "transmitting the wireless network information to the image forming apparatus", establishing the keyless communication connection with the image forming apparatus based on the request of the first network identification information.

Optionally, before establishing the keyless communication connection with the image forming apparatus based on the request of the first network identification information, the method further includes after obtaining the first network identification information and the second network identification information, displaying the first network identification information or the second network identification information in a search list; and when the user selects the first network identification information or the second network identification information in the search list, and current application scenario is "transmitting the wireless network information to the image forming apparatus", establishing the keyless communication connection with the image forming apparatus based on the request of the first network identification information.

In one embodiment, searching the image forming apparatus and obtaining the first network identification information without the corresponding encryption key and the second network identification information with the corresponding encryption key which are sent out by the image forming apparatus, may include searching, by the terminal device, the image forming apparatus and obtaining the second network identification information with the corresponding encryption key, and may not find the first network identification information without the corresponding encryption key. The terminal device may obtain the first network identification information based on the second network identification information according to the preset rule; and based on the first network identification information, a request may be sent to the image forming apparatus for establishing the keyless communication connection with the image forming apparatus, so that wireless network information may be sent to the image forming apparatus.

In multiple embodiments provided in the present disclosure, it should be understood that the disclosed device and method may also be implemented through other manners. The device and method embodiments described above may merely be exemplary. For example, flowcharts and block diagrams in the drawings may show possible implementation architectures, functions, and operations of the devices, methods, and computer program products according to multiple embodiments of the present disclosure. Each block in the flowcharts or block diagrams may represent a module, a program segment, or a part of the code; and the module, the program segment or the part of the code may contain one or more executable instructions for implementing specified logic functions. It should also be noted that in some optional implementations, the functions marked in the blocks may also occur in a different order from the order marked in the drawings. For example, two consecutive blocks may actually be executed substantially in parallel, or may sometimes be executed in a reverse order, depending on the functions involved. It should also be noted that each block in the block diagrams and/or flowcharts and the combination of the blocks in the block diagrams and/or flowcharts may be implemented by a dedicated hardware-based system that performs the specified functions or actions or may be implemented by a combination of dedicated hardware and computer instructions.

Furthermore, functional modules in the various embodiments of the present disclosure may be integrated together to form an independent part, or each module may exist separately, or two or more modules may be integrated to form an independent part.

If the function is implemented in the form of a software function module and sold or used as an independent product, it can be stored in a computer readable storage medium. Based on such understanding, the technical solutions of the present disclosure, or the part that contributes to the existing technology, or the part of the technical solutions may be essentially embodied in the form of a software product. The computer software product may be stored in a storage medium and include several instructions to make a computer device (e.g., a personal computer, an electronic device, a network device, or the like) execute all or part of the steps of the methods described in various embodiments of the present disclosure. Above-mentioned storage media may include various media that can store program codes, including a U disk, a mobile hard disk, a read-only memory (ROM), a random-access memory (RAM), a magnetic disk, an optical disk, and/or the like. It should be noted that in the present disclosure, the terms "include", "contain" or any other variants thereof may be intended to cover non-exclusive inclusion, such that a process, method, article, or device which include a series of elements may include not only those elements, but also include other elements that are not explicitly listed, or also include elements inherent to the process, method, article, or device. If there are no more restrictions, the element defined by the sentence "include a . . . " may not exclude the existence of other identical elements in the process, method, article, or device that include such element.

Above-mentioned descriptions may merely be optional embodiments of the present disclosure and may not be intended to limit the present disclosure. For those skilled in the art, the application may have various modifications and changes. Any modification, equivalent replacement, improvement and the like made within the spirit and principle of the present disclosure shall be included in the protection scope of the present disclosure.

What is claimed is:

1. A network connection configuration method, comprising:
    sending out first network identification information without a corresponding encryption key and second network identification information with a corresponding encryption key, such that a first terminal device receives the first network identification information and the second network identification information, wherein the first network identification information is configured to enable the first terminal device to establish a keyless communication connection with an image forming apparatus based on the first network identification information, and the second network identification information is configured to enable the first terminal device to establish a key communication connection with the image forming apparatus based on the second network identification information with the corresponding encryption key;
    during a state of sending out the first network identification information and the second network identification information, monitoring whether a request is received to establish the keyless communication connection based on the first network identification information;
    when the request is received from the first terminal device to establish the keyless communication connection based on the first network identification information, establishing the keyless communication connection with the first terminal device;
    obtaining wireless network information sent by the first terminal device based on the keyless communication connection; and
    establishing a communication connection with a corresponding wireless network device based on the wireless network information.

2. The method according to claim 1, wherein sending out the first network identification information without the corresponding encryption key and the second network identification information with the corresponding encryption key includes:
    sending out the first network identification information and the second network identification information simultaneously or alternately.

3. The method according to claim 1, before sending out the first network identification information without the corresponding encryption key and the second network identification information with the corresponding encryption key, further including:
    determining whether the image forming apparatus is connected to a wireless network device; and
    when the image forming apparatus is not connected to the wireless network device, sending out the first network identification information.

4. The method according to claim 1, before establishing the keyless communication connection with the first terminal device, further including:
    after obtaining the first network identification information and the second network identification information, the first terminal device displaying the first network identification information and the second network identification information respectively in a search list; and
    when the user selects the first network identification information or the second network identification information in the search list, and current application scenario is "transmitting the wireless network information to the image forming apparatus", establishing the keyless communication connection with the image forming apparatus based on the request of the first network identification information.

5. The method according to claim 1, before establishing the keyless communication connection with the first terminal device, further including:
    after obtaining the first network identification information and the second network identification information, the first terminal device displaying the first network identification information or the second network identification information in a search list; and
    when the user selects the first network identification information or the second network identification information in the search list, and current application scenario is "transmitting the wireless network information to the image forming apparatus", establishing the keyless communication connection with the image forming apparatus based on the request of the first network identification information.

6. A non-transitory computer-readable storage medium, containing program instructions for, when being executed by a processor, performing a network connection configuration method according to claim 1.

7. An image forming apparatus, comprising:
    a memory, for storing computer-executable instructions; and
    at least one processor, coupled with the memory and configured, when the computer-executable instructions being executed, to perform a network connection configuration method, comprising:
        sending out first network identification information without a corresponding encryption key and second network identification information with a corresponding encryption key, such that a first terminal device receives the first network identification information and the second network identification information, wherein the first network identification information is configured to enable the first terminal device to establish a keyless communication connection with the image forming apparatus based on the first network identification information, and the second network identification information is configured to enable the first terminal device to establish a key communication connection with the image forming apparatus based on the second network identification information with the corresponding encryption key;

during a state of sending out the first network identification information and the second network identification information, monitoring whether a request is received to establish the keyless communication connection based on the first network identification information;

when the request is received from the first terminal device to establish the keyless communication connection based on the first network identification information, establishing the keyless communication connection with the first terminal device;

obtaining wireless network information sent by the first terminal device based on the keyless communication connection; and establishing a communication connection with a corresponding wireless network device based on the wireless network information.

8. The apparatus according to claim 7, wherein the processor is further configured to:
send out the first network identification information and the second network identification information simultaneously or alternately.

9. The apparatus according to claim 7, wherein the processor is further configured to:
determine whether the image forming apparatus is connected to a wireless network device; and
when the image forming apparatus is not connected to the wireless network device, send out the first network identification information.

10. The apparatus according to claim 7, wherein, before establishing the keyless communication connection with the terminal device,
after the first network identification information and the second network identification information are obtained, the first terminal device displays the first network identification information and the second network identification information respectively in a search list; and
when the user selects the first network identification information or the second network identification information in the search list, and current application scenario is "transmitting the wireless network information to the image forming apparatus", the keyless communication connection is established with the image forming apparatus based on the request of the first network identification information.

11. The apparatus according to claim 7, wherein, before establishing the keyless communication connection with the first terminal device,
after the first network identification information and the second network identification information are obtained, the first terminal device displays the first network identification information or the second network identification information in a search list; and
when the user selects the first network identification information or the second network identification information in the search list, and current application scenario is "transmitting the wireless network information to the image forming apparatus", the keyless communication connection is established with the image forming apparatus based on the request of the first network identification information.

12. A network connection configuration method, comprising:
sending out second network identification information with a corresponding encryption key, such that a terminal device receives the second network identification information, wherein the second network identification information is configured to enable the terminal device to establish a key communication connection with an image forming apparatus based on the second network identification information with the corresponding encryption key; the second network identification information is further configured to enable the terminal device to determine first network identification information without a corresponding encryption key based on the second network identification information; and the first network identification information is configured to enable the terminal device to establish a keyless communication connection with the image forming apparatus based on the first network identification information;

during a state of sending out the second network identification information, monitoring whether a request is received to establish the keyless communication connection based on the first network identification information;

when the request is received from the terminal device to establish the keyless communication connection based on the first network identification information, establishing the keyless communication connection with the terminal device;

obtaining wireless network information sent by the terminal device based on the keyless communication connection; and establishing a communication connection with a corresponding wireless network device based on the wireless network information.

13. The method according to claim 12, when the terminal device requests to establish the keyless communication connection based on the first network identification information, further including:
after acquiring the second network identification information, displaying the second network identification information in a search list; and
after the user selects the second network identification information in the search list, and current application scenario is "transmitting the wireless network information to the image forming apparatus", obtaining the first network identification information based on the second network identification information according to a preset rule.

* * * * *